United States Patent [19]
Sampson

[11] Patent Number: 5,995,495
[45] Date of Patent: Nov. 30, 1999

[54] METHOD OF AND SYSTEM FOR PROVIDING GEOGRAPHICALLY TARGETED BROADCAST SATELLITE SERVICE

[75] Inventor: Charles E. Sampson, Vienna, Va.

[73] Assignee: MCI Communications Corporation, Washington, D.C.

[21] Appl. No.: 08/862,281

[22] Filed: May 23, 1997

[51] Int. Cl.[6] .................................................. H04B 7/185
[52] U.S. Cl. ............................................................ 370/316
[58] Field of Search ................................... 370/315, 316, 370/486, 487, 485, 323, 319, 321; 455/3.2, 427, 11.1, 12.1, 15, 16, 25, 3.1; 348/6, 7, 8, 12, 13

[56] References Cited

U.S. PATENT DOCUMENTS

| | | | |
|---|---|---|---|
| 4,905,221 | 2/1990 | Ichiyoshi | 375/200 |
| 5,428,600 | 6/1995 | Potier | 370/316 |
| 5,553,069 | 9/1996 | Ueno et al. | 370/315 |
| 5,592,481 | 1/1997 | Wiedeman et al. | 370/316 |
| 5,594,780 | 1/1997 | Wiedeman et al. | 370/316 |
| 5,625,624 | 4/1997 | Rosen et al. | 370/316 |

*Primary Examiner*—Ajit Patel

[57] ABSTRACT

A method of and system for providing local direct broadcast satellite service by transmitting a plurality of local programming packages. The satellite transmits the local programming packages to a plurality of geographically separate local ground areas.

12 Claims, 5 Drawing Sheets

FIG. 4A

| UPLINK TRANSPONDER | 1 |  | 3 | 4 | 5 |  | 7 | 8 | 9 |  | 11 | 12 | 13 |
|---|---|---|---|---|---|---|---|---|---|---|---|---|---|
| DOWNLINK TRANSPONDER | 1 |  | 3 | 4 | 5 |  | 7 | 8 | 9 |  | 11 | 12 | 13 |
| TWTA | 1 |  | 2 | 3 | 4 |  | 5 | 6 | 7 |  | 8 | 9 | 10 |
| BEAM | C |  | C | C | C |  | C | C | C |  | C | C | C |

FIG. 4B

| UPLINK TRANSPONDER | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| DOWNLINK TRANSPONDER | 15 | 16 | 17 | 18 | 19 | 20 | 21 | 22 | 23 | 24 | 25 | 26 | 27 | 28 |
| TWTA | 11 | 12 | 13 | 14 | 15 | 16 | 17 | 18 | 19 | 20 | 21 | 22 | 23 | 24 |
| BEAM | C | C | C | C | C | C | C | C | C | C | C | C | C | C |

| UPLINK TRANSPONDER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| DOWNLINK TRANSPONDER | 2 | 6 | 10 | 14 | 2 | 6 | 10 | 14 | 2 | 6 | 10 | 14 | 2 | 6 | 10 | 14 |
| TWTA | 25 | 25 | 25 | 25 | 26 | 26 | 26 | 26 | 27 | 27 | 27 | 27 | 28 | 28 | 28 | 28 |
| BEAM | 1 | 2 | 3 | 4 | 5 | 6 | 7 | 8 | 9 | 10 | 11 | 12 | 13 | 14 | 15 | 16 |

FIG. 5A

| UPLINK TRANSPONDER | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| DOWNLINK TRANSPONDER | 2 | 6 | 10 | 14 | 2 | 6 | 10 | 14 | 2 | 6 | 10 | 14 | 2 | 6 | 10 | 14 |
| TWTA | 29 | 29 | 29 | 29 | 30 | 30 | 30 | 30 | 31 | 31 | 31 | 31 | 32 | 32 | 32 | 32 |
| BEAM | 17 | 18 | 19 | 20 | 21 | 22 | 23 | 24 | 25 | 26 | 27 | 28 | 29 | 30 | 31 | 32 |

FIG. 5B

METHOD OF AND SYSTEM FOR PROVIDING GEOGRAPHICALLY TARGETED BROADCAST SATELLITE SERVICE

FIELD OF THE INVENTION

The present invention relates generally to communications satellites, and more particularly to a method of and system for providing geographically targeted programming, such as local television service, in a broadcast satellite system.

DESCRIPTION OF THE PRIOR ART

Satellites have been used in communications for several years. Since about the mid-1970's, the use of satellites for television broadcast and cable television program transmission and distribution has grown tremendously. Until recently, satellites have been used primarily for commercial television activities, although a substantial number of individuals own earth stations with which they can receive commercial television satellite transmissions.

Recently, with the introduction of a digital transmission format for direct broadcast satellite (DBS) services, direct broadcasting from satellites to homes has become practical. The number of individuals purchasing digital DBS receivers and contracting with service providers is growing at a tremendous rate. The relatively low cost of digital DBS receivers and the greater number of available programs makes DBS an attractive alternative to cable television for some customers.

The elements of a satellite communication system include an earth station uplink that transmits a signal to a satellite in a very narrow beam. At the satellite, the signal is received and amplified, and its frequency converted to a downlink frequency. The satellite transmits the signal back to the ground to cover an area known as the satellite's footprint.

A block diagram of a currently existing DBS satellite is illustrated in FIG. 2. In United States DBS systems, the uplink signals are transmitted from a single uplink station in a frequency band from 17.3 to 17.8 GHz. The composite 500 MHz wide frequency division multiplexed uplink signal is received at the uplink receiving antenna 10 of the satellite and frequency converted in a receiver 12 to a downlink frequency band of 12.2 to 12.7 GHz. Sub-bands, which contain individual programming packages, are demultiplexed or separated by filtering with a demultiplexer 14 and routed to separate power amplifiers, which typically are traveling wave tube amplifiers (TWTAs) $16a$–$16ff$. The outputs from TWTAs $16a$–$16ff$ are combined or frequency division multiplexed with a multiplexer 18 and routed to left-hand circular and right-hand circular polarized antenna feeds. The LHCP and RHCP feeds supply signals to a downlink antenna 20, which directs a wide beam to the ground.

In the current DBS configuration, there are thirty-two frequency, or transponder, assignments. Alternate transponder channels have right- and left-hand circular polarization. The transponder bandwidth is 24 MHz and the spacing between transponder channels or sub-bands, of the same polarity is 29.16 MHz, thereby providing a 5.16 MHz guardband. The spacing between channels of opposite polarity is 14.58 MHz, which means that their spectra overlap to provide a measure of frequency reuse.

The center frequencies for the uplinks and downlinks are given by:

$f_u = 17.324 + (N-1)*0.01458$ GHz, and $f_d = 12.224 + (N-1)*0.01458$ GHz, where N is the channel number from 1 to 32. Channel definitions are in accordance with the ITU frequency plan for Region 2, as specified in the Appendices to the Radio Regulations, 1994. The regulations specify that odd numbered channels will be transmitted with right hand circular polarization (RHCP), and even numbered channels will be transmitted with left hand circular polarization (LHCP).

Each of the thirty-two sub-bands carries a single programming or statmux package. A programming package comprises a group of television signals or programs that are encoded with digital compression techniques, such as MPEG-2. The compressed programs are accumulated into a digital data stream using statistical multiplexing techniques. With current technology, a programming package can contain up to ten television channels.

Satellites currently providing, or under construction to provide, DBS service offer programming signals that are broadcast to all portions of the desired coverage area. All programming is distributed over the coverage area, which in the United States includes the continental U.S. (CONUS) and possibly Hawaii, Alaska and Puerto Rico. Local programming, which would include signals from local broadcast stations and other programming of local interest, is not available to DBS subscribers.

Current satellite configurations of the type illustrated in FIG. 2 cannot accommodate the large number of local broadcast stations in a large country. For example, in the United States, there are more than one thousand local television stations. With current satellite configurations, local broadcast would require that the signals of over one thousand television stations be distributed over the entire CONUS. Using current satellite design techniques, there is not enough available frequency spectrum or satellite power to do this. Current DBS satellites, which use a single downlink coverage beam, are limited to the distribution of thirty-two programming packages, which can provide a maximum of 320 television programs (assuming ten television programs per programming package).

Most individuals want access to local programming as well as national and premium programming. Since DBS cannot currently provide local programming, DBS operators are at a disadvantage when competing against cable operators. The ability to provide local programming would give DBS operators the ability to compete more effectively with cable operators. Accordingly, it is an object of the present invention to provide direct broadcast satellite service that includes local programming.

SUMMARY OF THE INVENTION

Briefly stated, the present invention provides local or geographically targeted direct broadcast satellite (DBS) service by transmitting a plurality of local programming packages, each carried on a separate uplink frequency and uplink antenna beam combination, from a ground location to a satellite. The satellite transmits, on a number of downlink frequencies that can be less than the number of uplink frequencies, the local programming packages to a plurality of geographically separate local ground areas. Preferably, the present invention also provides wide area direct broadcast satellite service by transmitting a plurality of wide area programming packages, each on a separate uplink frequency, from a ground location to the satellite. The satellite transmits the wide area programming packages to a ground coverage area that encompasses the geographically separate local ground areas.

Uplink and downlink satellite antenna spot beams, which can be implemented with a combination of single and multiple feed antennas, illuminate desired portions of a coverage area. Multiple programming packages are amplified with a single TWTA. Individual programming packages are path routed and frequency converted on an individual basis. Frequency reuse is achieved by assigning the same frequency or channel number to multiple spot beams.

The available frequencies in both the uplink and downlink frequency bands, is specified and limited according to international standards. For example, in the United States, DBS uses the Ku band, with thirty-two sub-bands between 12.2 and 12.7 GHz for downlink and thirty-two sub-bands or frequency channels between 17.3 and 17.8 GHz for uplink. Accordingly, the system of the present invention allocates a number of the available downlink frequencies to local service and the remaining available downlink frequencies to wide area service. The satellite transmits the wide area programming packages on downlink frequencies that are different from the downlink frequencies upon which the local programming packages are transmitted. Customers in a local ground location receive their local programs on one of the local coverage downlink frequencies and wide area programming packages on the full coverage downlink frequencies.

In describing the distinction between a full coverage DBS satellite and a local DBS satellite, it is helpful to define a local DBS transponder. A satellite transponder is the equipment which receives, frequency converts, amplifies and transmits the signal from the downlink antenna for a designated satellite channel. It is the total processing chain for an individual signal or programming package. For a standard DBS satellite system, there are 32 transponders. The satellite equipment for each transponder is designated by a single index within the range 1 to 32. The local DBS satellite system requires the following four indices to designate a transponder:

$N_{bu}$—The number of the uplink beam (1 to $N_{but}$, where $N_{but}$ is the total number of uplink beams);

$N_{fu}$—The number of the uplink frequency or channel within the frequency plan (1 to 32);

$N_{bd}$—The number of the downlink beam (1 to $N_{bdt}$, where $N_{bdt}$ is the total number of downlink beams); and, $N_{fd}$—The number of the downlink frequency or channel within the frequency plan (1 to 32).

The four indices uniquely designate the path from the unlinking earth station, through satellite processing and to the downlink satellite beam for the local DBS satellite. Since each uplink beam is limited to 32 programming packages due to the 500 MHz frequency limitation, the minimum number of required uplink beams is given by:

$N_{butmin} = (N_{progpack})/32$, rounded to the next highest number, where $N_{progpack}$ is the total number of programming packages which is the sum of the number of full coverage packages ($N_{fullpack}$) plus the number of local packages ($N_{localpack}$).

The maximum number of downlink beams is given by:

$$N_{bdtmax} = (N_{progpack} - N_{fullpack})$$

The maximum number of programs ($N_{progmax}$) that can be accommodated by a given TWTA configuration is given by:

$$N_{progmax} = (N_{twtfull} * N_{ft} + N_{twtlocal} * N_{lt}) * N_{pp}$$

where $N_{twtfull}$ is the number of TWTAs devoted to full coverage program packages, $N_{ft}$ is the number of full coverage program packages per TWTA, $N_{twtlocal}$ is the number of TWTAs devoted to local coverage program packages, $N_{lt}$ is the number of local coverage program packages per TWTA, and $N_{pp}$ is the number of programs in a program or statmux package. For the preferred embodiment of the present invention:

$$N_{progmax} = (24*1 + 8*4)*10 = 560.$$

In an implementation of the present invention in which all of the TWTAs are devoted to local programming, $N_{progmax}$ is given as follows:

$$N_{progmax} = (0*1 + 32*4)*10 = 1280.$$

The satellite includes at least a pair of uplink receiving antenna beams. One of the uplink receiving antenna beams receives a signal carrying the wide area programming packages and the others receive the local programming packages. Each uplink receiving antenna is a spot beam antenna system so the full uplink frequency bandwidth can be reused for each uplink beam.

The satellite multiple downlink beams can be configured by either (1) multiple antennas with non-overlapping beams or (2) a single antenna reflector with multiple antenna feeds which with each feed corresponds to a separate non-overlapping spot beam. The satellite receives one or more uplink beams carrying the local programming packages and splits the signal from each beam into a plurality of uplink sub-bands or channels. Each uplink sub-band carries one programming package. The satellite then converts the uplink sub-bands to the downlink sub-bands allocated to local programming packages. For example, in the preferred embodiment, the satellite converts thirty-two uplink sub-bands to four downlink sub-bands, so that each downlink sub-band carries eight different local programming packages. Eight downlink beams share the same sub-band. This reuse of frequency spectrum with spot beams provides the capacity to generate the number of programming packages necessary to meet the demands for local DBS. Each TWTA amplifier amplifies a programming package for each frequency. In the preferred embodiment, this would be four programming packages per TWTA. At the output of the TWTA, the four programming packages are separated by filtering and routed to the appropriate feed on the downlink antenna. The spot beam downlink antenna directs the downlink beams to the geographically separate ground locations.

Thus, in the preferred embodiment, the satellite forms thirty-two downlink beams that can deliver local programs to thirty-two separate ground locations. This is accomplished with the use of four frequency sub-bands and eight TWTAs where it would require 32 sub-bands and 32 TWTAs in a typical DBS satellite configuration of the prior art.

Since a selected number of downlink frequencies are allocated to local service, that number of frequencies is unavailable for wide area service. Accordingly, the system does not use all of the available uplink frequencies for wide area programming packages. The satellite receives an uplink signal that carries the wide area programming packages as well as the local program packages. The satellite amplifies each wide area programming package with a separate power amplifier. Then, the satellite combines the amplified wide area programming packages into a single wide area beam, which it transmits to the ground with a wide beam antenna.

BRIEF DESCRIPTION OF THE DRAWINGS

FIGS. 4A and 4B comprise a table illustrating the allocation of transponders and power amplifiers to wide area programming packages according to the preferred embodiment.

FIGS. 5A and 5B comprise a table illustrating the allocation of transponders and power amplifiers to local area programming packages according to the present invention.

DESCRIPTION OF THE PREFERRED EMBODIMENT

Figure 1:
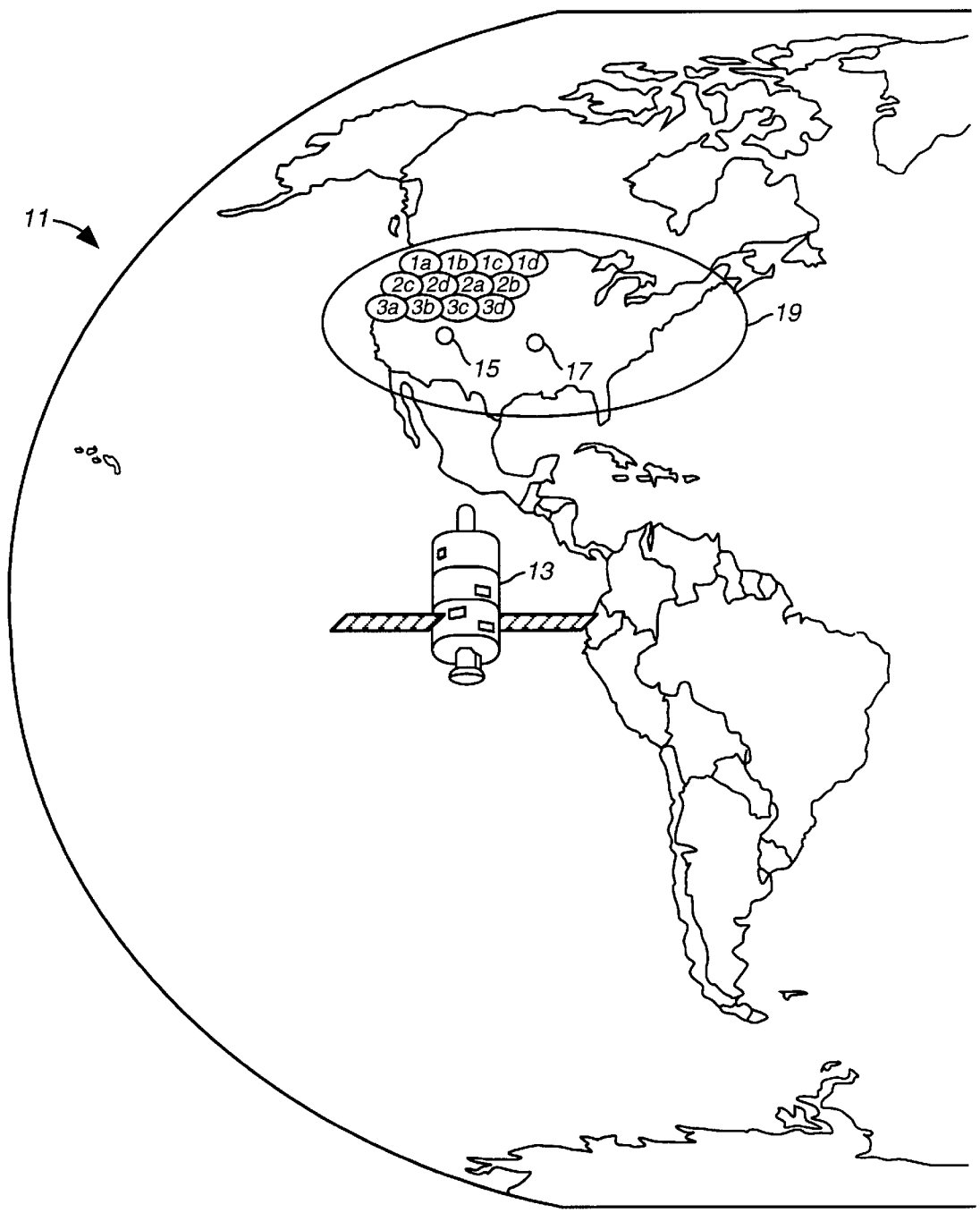
FIG. 1 is a pictorial view of the system of the present invention.
Figure 2:
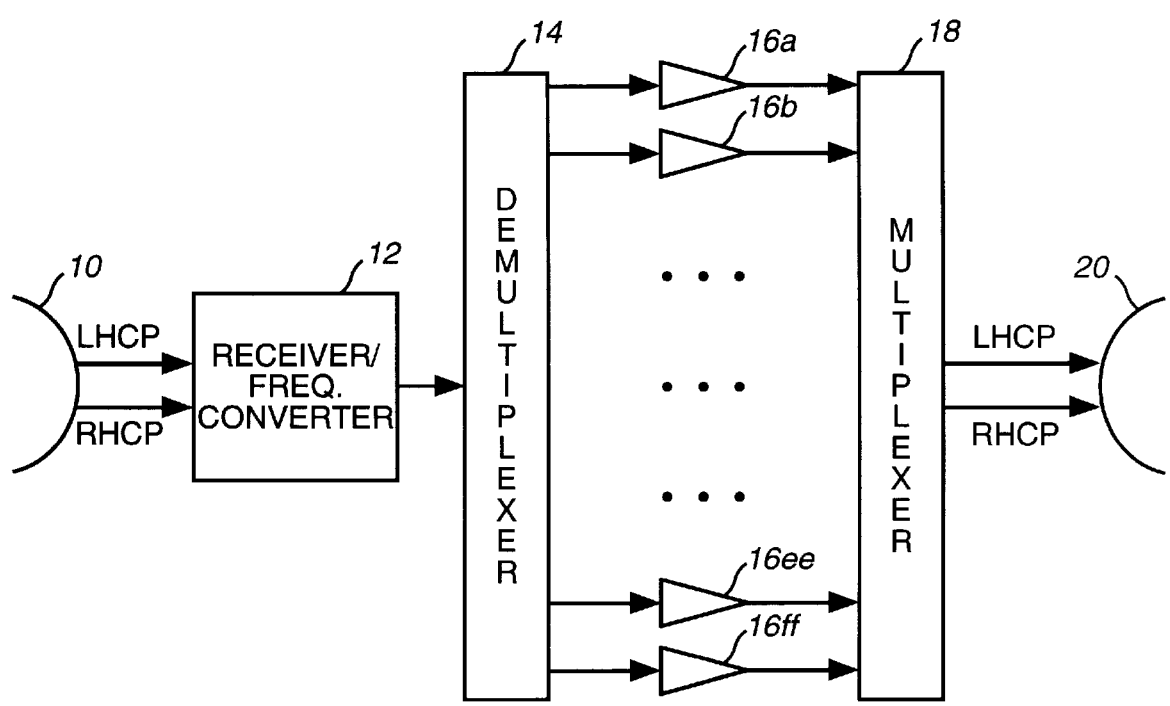
FIG. 2 is a block diagram of a typical DBS satellite of the prior art.

Referring now to the drawings, and first to FIG. 1, a portion of the surface of the earth is designated generally by the numeral 11. A satellite 13 is in a geosynchronous orbit, preferably in a direct broadcast satellite (DBS) orbital slot. In the United States, three DBS orbital slots, at 101°, 110° and 119° west longitude, provide full CONUS coverage. Although the preferred embodiment of the present invention is in a DBS system, the present invention may be applied to other systems, such as fixed satellite service (FSS).

The system of the present invention includes at least two geographically separated uplink transmitters 15 and 17. The transmissions from transmitters 15 and 17 are received by a separate beam of the satellite uplink spot beam antennas. Each uplink earth station 15 and 17 transmits an uplink signal in the 17.3 to 17.8 GHz frequency band to satellite 13. As will be explained in detail hereinafter, satellite 13 includes at least two spot beam uplink receiving antennas. Uplink transmitters 15 and 17 are spaced far enough apart so that they are situated within separate satellite uplink spot beams and do not interfere with each other at satellite 13. One of uplink transmitters 15 and 17 can transmit any mix of local and full coverage programming packages to satellite 13.

Referring still to FIG. 1, there is shown a portion of North America that includes the forty-eight contiguous United States. The footprint of a wide area CONUS DBS satellite beam is represented by oval 19. Receivers located within the area encompassed by oval 19 can receive wide area direct broadcast signals in a downlink band from 12.2 to 12.7 GHz. The downlink band is divided into thirty-two sub-bands. Each sub-band can carry one programming package, and each programming package can currently carry up to about ten separate television programs, although new signal processing and compression technologies will probably increase the number of programming packages that can be carried on a single frequency. Accordingly, a typical DBS satellite can currently provide up to about 320 separate television programs over the entire coverage area represented by oval 19.

However, as will be explained in detail hereinafter, according to the present invention, certain of the thirty-two available downlink sub-bands are allocated to local area programming packages. In the preferred embodiment, four of the thirty-two downlink sub-bands are allocated to local programming packages. Thus, in the present invention, at most twenty-eight sub-bands are available for wide area programming packages. However, the satellite of the system of the present invention includes at least one spot beam downlink antenna that is adapted to transmit multiple spot beams to a plurality of geographically separate local ground locations.

In FIG. 1, the local ground locations covered by the downlink spot beams are designated by small ovals. For example, the local coverage area around Seattle, Wash., is represented by oval 1a, and the local coverage area around Portland, Oreg., is represented by oval 2c. According to the present invention, local programming packages are carried on four separate downlink frequency sub-bands or transponder channels. Thus, local Seattle programming packages could be carried, for example, on downlink transponder number two (12.24 GHz) and local Portland programming packages could be carried on transponder number six (12.30 GHz). Subscribers located within the intersection of ovals 1a and 2c can receive signals for both Seattle and Portland stations.

The present invention allows for downlink transponder frequency reuse. By spacing apart beams on the same frequency, local programming can be provided with only four downlink frequencies. The use of a four frequency downlink plan is illustrated in FIG. 1 where the four frequencies are designated by suffixes a, b, c, and d, in local coverage areas 1a–3d. As seen from FIG. 1, beams of the same frequency do not overlap, while providing uniform local coverage of a contiguous area.

Figure 3:
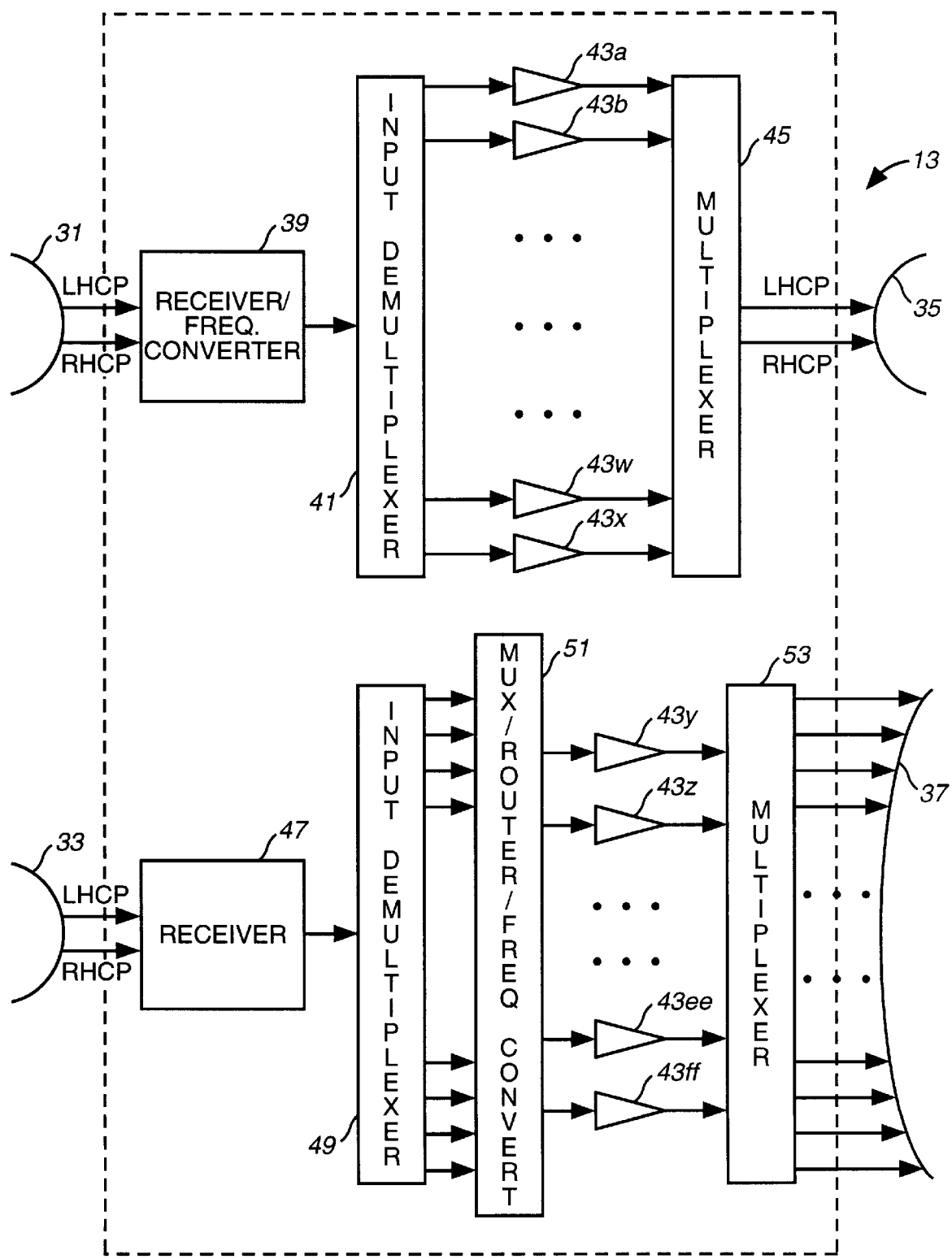
FIG. 3 is block diagram of a satellite according to the present invention.

Referring now to FIG. 3, there is shown a block diagram of the payload of satellite 13 of the present invention. Satellite 13 includes a spot beam uplink receiving antenna 31 for receiving a wide area uplink signal, and a spot beam uplink receiving antenna 33, receiving an uplink signal carrying local area programming packages. Satellite 13 also includes a wide beam transmitting antenna 35 for transmitting wide area programming packages to the ground, and a spot beam downlink antenna 37 for transmitting local area programming packages to the ground.

Uplink antenna 31 is connected to supply signals to a wideband receiver and frequency converter 39. Receiver 39 is of the type well-known in the art and it includes a low noise amplifier and a mixer. Receiver 39 receives at its input from antenna 31 a signal in the 17.3 to 17.8 GHz uplink band and produces at its output a signal in the 12.2 to 12.7 GHz downlink band. Each transponder channel or sub-band within the uplink signal is thus converted to an appropriate downlink transponder channel or sub-band.

The output from receiver 39 is fed to an input demultiplexer or filter 41. Input demultiplexer 41 separates the 500 MHz wide broadband output from receiver 39 into the separate transponder frequency channels. In the preferred embodiment example of the present invention, and as will be explained in detail hereinafter, downlink transponder channels two, six, ten, and fourteen are allocated to local programming packages. Accordingly, those channels are not used for wide area service. Since receiver 39 performs simple frequency conversion, in which each uplink transponder number is converted to its corresponding downlink transponder number, the uplink signal received at antenna 31 and receiver 39 does not include signals in the sub-bands allocated to transponder numbers two, six, ten, and fourteen.

The individual outputs of input multiplexer 41 are each fed to a separate power amplifier 43. Each output contains a separate programming package. In the preferred embodiment, each power amplifier 43 includes a traveling wave tube (TWT).

The allocation of frequency sub-bands, or transponder channels, and TWTAs in the portion of satellite 13 devoted to wide area programming is illustrated in FIGS. 4A and 4B. Since downlink transponder channels two, six, ten, and fourteen are devoted to local programming, those channels are not used for wide area programming, as shown by the empty columns in FIG. 4A.

Referring again to FIG. 3, in the preferred embodiment, satellite 13 includes a total of thirty-two TWTAs 43a–43ff. As will be explained in detail hereinafter, eight TWTAs 43y–43ff are allocated to the local area portion of satellite 13. Accordingly, twenty-four TWTAs 43a–43x, which correspond to TWTAs 1–24, respectively, in FIGS. 4A and 4B, are allocated to the wide area portion of satellite 13. Since each downlink transponder channel is amplified by a separate TWTA 43, in the preferred embodiment, the number of full coverage downlink transponder channels, and hence the number of full coverage uplink transponder channels, is limited to twenty-four. However, those skilled in the art will recognize that four additional TWTAs could be included in satellite 13 to provide the full twenty-eight available wide area transponder channels.

The amplified outputs of TWTAs 43a–43x are fed to a combiner or multiplexer 45. Multiplexer 45 produces two 500 MHz wide downlink composite signals that are fed to the wide area, or CONUS (as indicated by the letter C in FIGS. 4A and 4B), downlink antenna 35. One composite signal containing even numbered channels is fed to the LHCP (left-hand circular polarization) and one containing odd numbered channels is fed to the RHCP (right-hand circular polarization).

The local area signal received at spot beam uplink antenna 33 is fed to the input of a receiver 47. In the preferred embodiment, the local area uplink signal carries all thirty-two uplink transponder channels. However, according to the present invention, only four downlink transponder channels are allocated to local area programming. Accordingly, receiver 47 does not provide any frequency conversion function.

The output of receiver 47 is coupled to the input of a second input demultiplexer 49. Second input demultiplexer 49 separates the 500 MHz wide uplink signal into thirty-two uplink transponder channels. The thirty-two separate outputs from second input demultiplexer 49 are fed to a combination frequency converter, multiplexer, and router 51. Router 51 converts selected uplink transponder channels to selected downlink transponder channels.

Referring to FIGS. 5A and 5B, which illustrates the allocation of downlink transponders or channels and TWTAs in the portion of satellite 13 devoted to local programming, uplink channel number one is converted to downlink channel number two, uplink channel number two is converted to downlink channel number six, uplink channel number three is converted to downlink channel number ten, and uplink channel number four is converted to downlink channel number fourteen. In similar fashion, the succeeding groups of four uplink channel numbers are converted to those four downlink channel numbers.

The multiplexer portion of router 51 forms eight programming package groups of four programming packages each and routes them to a single output. Thus, the inputs of uplink transponder numbers one through four are multiplexed and routed to a single output. Similarly, succeeding groups of four uplink transponder numbers are multiplexed and routed to single outputs of router 51.

Each output from router 51 is fed to a single TWTA 43. Thus, each TWTA 43y–43ff, which correspond to TWTAs 25–32, respectively, in FIGS. 5A and 5B, amplifies the four signals carrying programming packages on each of four downlink channels.

The eight outputs from TWTAs 43y–43ff are fed to an output demultiplexer 53. Demultiplexer 53 separates the eight outputs from TWTAs 43y–43ff into thirty-two separate downlink beams, which are numbered 1–32 in FIGS. 5A and 5B. Each downlink beam carries one programming package. The thirty-two downlink beams are fed to spot beam downlink antenna 37. The feeds of the thirty-two beams are positioned and arranged so as to produce thirty-two separate spot beams, which are directed to geographically separate ground locations.

Since each TWTA 43y–43ff (25–32 in FIGS. 5A and 5B) amplifies four beams, rather than a portion of a single wide area CONUS beam, each of the thirty-two local programming beams has substantially less power than the wide area CONUS beam of antenna 35. However, the increased gain of spot beam transmitting antenna 37, compared to that of wide beam antenna 35, compensates for the losses caused by TWTA backoff and power sharing.

From the foregoing, those skilled in the art will recognize that the present invention is well adapted to achieve the objects of the invention and overcome the shortcomings of the prior art. The present invention provides a satellite broadcast system that makes efficient use of satellite resources to distribute local programming. The system uses a synergistic combination of spot beam uplink and downlink satellite antennas, multiple carriers per TWTA amplification, individual signal routing, and frequency reuse, to provide efficient local DBS operation.

With the exception that the number of programming packages uplinked is the same as the number of programming packages downlinked, the combination of uplink frequency plan and spot beam configuration is independent of the downlink frequency plan and spot beam configuration. The system is flexible allowing a wide range of full coverage and local programming packages to be covered within the design parameters. The system can provide local and wide area coverage from a single satellite or from collocated satellites.

The present invention has been described and illustrated with respect to a preferred embodiment. Those skilled in the art will recognize that certain features and combinations of features may be used independently of other features. For example, the specific frequency allocations and assignments described are for purposes of illustration and are not intended to limit the spirit and scope of the invention. Also, more or less of a satellite's resources may be devoted to local programming. A system could include two or more geographically spaced apart uplink transmitters for feeding local programming packages on separate uplink beams to a one satellite. A single satellite with thirty-two TWTAs may be devoted entirely to local programming. Such a system would direct 128 spot beams carrying local programming to the earth which could broadcast the signals of 1280 broadcast stations.

What is claimed is:

1. A method of providing broadcast satellite service comprising the steps of:

receiving a plurality of local programming packages at a satellite, wherein said plurality of local programming packages are transmitted from a ground location on a single uplink beam, and each of said local programming packages is carried on a separate unlink frequency of an uplink frequency band;

receiving a full coverage programming package at said satellite transmitting said plurality of local programming packages from said satellite to a plurality of geographically separate local ground areas, wherein said step of transmitting said local programming packages from said satellite to a plurality of geographically separate local ground areas includes the step of transmitting said local programming packages on a number of downlink frequencies that is less than the number of uplink frequencies;

transmitting said full coverage programming package from said satellite to a geographical area which includes said plurality of geographically separate local ground areas;

receiving a signal carrying said plurality of local programming packages at said satellite;

forming a plurality of local programming package groups from the plurality of local packages received at said satellite;

amplifying each of said local programming package groups; and separating the amplified local programming package groups into a plurality of individual amplified local programming packages.

2. The method as claimed in claim 1, wherein said step of forming a plurality of local programming package groups includes the steps of:

separating said uplink frequency band into a plurality of uplink frequency sub-bands;

converting said uplink frequency sub-bands to a subset of available downlink frequency sub-bands; and combining selected ones of said subset into groups of available downlink frequency sub-bands.

3. The method as claimed in claim 2, wherein said step of amplifying each of said local programming package groups includes the step of amplifying each of said groups of available downlink frequency sub-bands with a separate power amplifier.

4. The method as claimed in claim 2, wherein said step of separating the amplified local programming package groups into a plurality of individual amplified local programming packages includes the steps of separating said groups of available downlink frequency sub-bands into individual beams.

5. A method of providing broadcast satellite service, which comprises the steps of:

receiving a plurality of local programming packages at a satellite, wherein said plurality of local programming packages are transmitted from a ground location on a single unlink beam, and each of said local programming packages is carried on a separate unlink frequency of an uplink frequency band;

receiving a full coverage programming package at said satellite;

transmitting said plurality of local programming packages from said satellite to a plurality of geographically separate local ground areas;

transmitting said full coverage programming package from said satellite to a geographical area which includes said plurality of geographically separate local ground areas;

receiving a signal carrying said plurality of local programming packages at said satellite;

forming a plurality of local programming package groups from the plurality of local programming packages received at said satellite;

amplifying each of said local programming package groups; and separating the amplified local programming package groups into a plurality of individual amplified local programming packages.

6. The method as claimed in claim 5, wherein said step of forming a plurality of local programming package groups includes the steps of:

splitting said signal carrying said local programming packages into said separate uplink frequencies;

converting said split separate uplink frequencies into selected available downlink frequencies;

and combining said converted separate downlink frequencies to form said local programming package groups.

7. A broadcasting satellite, which comprises:

at least one spot beam downlink transmitting antenna, said spot beam downlink antenna including a plurality of feeds arranged to direct spot beams to a plurality of geographically separate local ground locations;

at least one local uplink receiving antenna arranged to receive a signal carrying a plurality of local programming packages transmitted from a ground transmitting location;

means for receiving local programming packages from said local uplink antenna and grouping said local programming packages into a plurality of local programming package groups;

a plurality of power amplifiers, each power amplifier of said plurality of power amplifiers being arranged to amplify one local programming package group; and, means for splitting each amplified local programming package group into individual programming packages and supplying each individual programming package to one of said feeds.

8. The broadcasting satellite as claimed in claim 7, including:

at least one wide beam downlink transmitting antenna arranged to direct a wide beam to the ground;

at least one wide area uplink receiving antenna arranged to receive a signal carrying a plurality of wide area programming packages transmitted from a ground transmitting location;

means for receiving wide area programming packages from said wide area uplink antenna;

a plurality of power amplifiers, each power amplifier of said plurality of power amplifiers being arranged to amplify one wide area programming package; and, means for supplying amplified wide area programming packages to said wide area downlink antenna.

9. The broadcasting satellite as claimed in claim 8; wherein said means for receiving local programming packages from said local uplink antenna and grouping said local programming packages into a plurality of local programming package groups comprises:

a wideband receiver coupled to said local uplink receiving antenna;

an input demultiplexer coupled to said wideband receiver for separating signals in an uplink frequency band into a plurality of uplink frequency sub-bands; and, input multiplexer means for combining said downlink frequency sub-bands into a plurality of groups of second downlink frequency sub-bands.

10. A broadcast satellite, which comprises:

a first uplink receiving antenna;

a first wideband receiver coupled to said first uplink receiving antenna, said first wideband receiver including means for converting signals from an uplink frequency band to a downlink frequency band;

a first input demultiplexer coupled to said first wideband receiver for separating signals in said downlink frequency band into a plurality of first downlink frequency sub-bands;

a plurality of first power amplifiers coupled to said first input demultiplexer, there being one first power amplifier for each first downlink frequency sub-band;

an output multiplexer coupled to said first power amplifiers for combining outputs from said first power amplifiers into a first downlink beam;

a wide area downlink transmitting antenna coupled to said first downlink beam;

a second uplink receiving antenna;

a second wideband receiver coupled to said second uplink receiving antenna;

a second input demultiplexer coupled to said second wideband receiver for separating signals in said uplink frequency band into a plurality of uplink frequency sub-bands;

means for converting said uplink frequency sub-bands into a number of second downlink frequency sub-bands, there being fewer of said second downlink frequency sub-bands than uplink frequency sub-bands;

second input multiplexer means for combining said second downlink frequency sub-bands into a plurality of groups of second downlink frequency sub-bands;

a plurality of second power amplifiers coupled to said second input demultiplexer means, there being one second power amplifier for each group of second downlink frequency sub-bands;

an output demultiplexer coupled to said second power amplifiers for splitting outputs from said second power amplifiers into a plurality of second downlink beams; and, a local area downlink transmitting spot beam antenna coupled to said second downlink beams.

11. A direct broadcast satellite system, which comprises:

at least one local programming package uplink transmitter;

at least one wide area programming package uplink transmitter;

a satellite positioned to receive signals from said uplink transmitters, said satellite including:

at least one local uplink receiving antenna arranged to receive a signal carrying a plurality of local programmin packages transmitted from said local programming package uplink transmitter;

at least one wide area uplink receiving antenna arranged to receive a signal carrying a plurality of wide area programming packages transmitted from said wide area uplink transmitter;

a converter for receiving local programming packages from said local uplink receiving antenna and grouping said local programming packages into a plurality of local programing package groups;

a plurality of power amplifiers, each power amplifier of said plurality of power amplifiers being arranged to amplify one local programming package group;

a demultiplexer for splitting each amplified local programming package group into individual programming packages and supplying each individual programming package to one of a plurality of feeds, at least one spot beam downlink transmitting antenna, said spot beam downlink antenna including said plurality of feeds arranged to direct spot beams, each carrying a local programming package, to a plurality of geographically separate local ground locations; and, at least one wide beam downlink transmitting antenna arranged to direct a wide beam, carrying a plurality of wide area programming packages, to ground.

12. The system as claimed in claim 11, wherein said satellite includes:

means for receiving wide area programming packages from said wide area uplink receiving antenna;

a plurality of second power amplifiers, each second power amplifier being arranged to amplify one wide area programmin package; and, means for supplying amplified wide area programming packages to said wide area downlink antenna.

* * * * *